United States Patent
Park et al.

(10) Patent No.: US 10,568,071 B2
(45) Date of Patent: Feb. 18, 2020

(54) METHOD FOR TRANSMITTING AND RECEIVING UPLINK SIGNAL FOR NB-IOT UE AND APPARATUS THEREFOR

(71) Applicant: KT CORPORATION, Gyeonggi-do (KR)

(72) Inventors: Kyujin Park, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 15/415,781

(22) Filed: Jan. 25, 2017

(65) Prior Publication Data

US 2017/0230961 A1 Aug. 10, 2017

(30) Foreign Application Priority Data

| Feb. 4, 2016 | (KR) | .......... | 10-2016-0014509 |
| Feb. 5, 2016 | (KR) | .......... | 10-2016-0015050 |
| Mar. 31, 2016 | (KR) | .......... | 10-2016-0039529 |
| Sep. 12, 2016 | (KR) | .......... | 10-2016-0117138 |

(51) Int. Cl.
*H04W 72/04* (2009.01)
*H04L 5/00* (2006.01)
*H04L 1/18* (2006.01)

(52) U.S. Cl.
CPC ....... *H04W 72/0413* (2013.01); *H04L 5/0055* (2013.01); *H04W 72/042* (2013.01); *H04W 72/0446* (2013.01); *H04L 1/1812* (2013.01)

(58) Field of Classification Search
None
See application file for complete search history.

(56) References Cited

U.S. PATENT DOCUMENTS

| 2014/0036856 A1* | 2/2014 | Park | ............... | H04L 1/1671 370/329 |
| 2015/0110029 A1* | 4/2015 | Hwang | ............ | H04L 1/0026 370/329 |
| 2015/0373739 A1* | 12/2015 | Seo | ............... | H04W 72/04 370/329 |

(Continued)

FOREIGN PATENT DOCUMENTS

WO    WO 2017/119931    *    1/2016

OTHER PUBLICATIONS

Han et al., "Options for NB-IOT Synchronization Signal Design", U.S. Appl. No. 62/276,482, filed Jan. 8 2016.*

(Continued)

*Primary Examiner* — Gregory B Sefcheck
*Assistant Examiner* — Jenkey Van
(74) *Attorney, Agent, or Firm* — IP Legal Services, LLC

(57) ABSTRACT

Provided are a method and apparatus for transmitting an uplink signal by a Narrow Band Internet of things (IoT) UE. The method may include receiving, from a base station, uplink resource allocation information for transmitting HARQ ACK/NACK for downlink data, configuring a time-axis wireless resource and a frequency-axis wireless resource of an uplink signal including the HARQ ACK/NACK, based on the uplink resource allocation information, and transmitting the uplink signal through the time-axis wireless resource and frequency-axis wireless resource.

12 Claims, 7 Drawing Sheets

(56) References Cited

U.S. PATENT DOCUMENTS

| | | | | |
|---|---|---|---|---|
| 2016/0205679 A1* | 7/2016 | Yoo | ............... | H04L 1/0026 |
| | | | | 370/329 |
| 2017/0180095 A1* | 6/2017 | Xue | ............... | H04L 5/0048 |
| 2018/0076924 A1* | 3/2018 | Lee | ............... | H04L 1/0026 |
| 2018/0249509 A1* | 8/2018 | Yi | ............... | H04J 11/0069 |
| 2018/0367278 A1* | 12/2018 | Chatterjee | ............... | H04W 4/70 |
| 2019/0058552 A1* | 2/2019 | Yang | ............... | H04W 76/27 |

OTHER PUBLICATIONS

Yi, Yunjung. "Initial Access Procedure to Handle CIoT MTC UE", U.S. Appl. No. 62/271,999, filed Dec. 28, 2015 (Year: 2015).*

Yi, Yunjung. "Initial Access Procedure to Handle CIoT MTC UE", U.S. Appl. No. 62/276,950, filed Jan. 10, 2016 (Year: 2016).*

Huawei et al., "Timing Relationships", R1-160098, 3GPP TSG RAN WG1 NB-IoT Ad-Hoc Meeting, Budapest, Hungary, Jan. 18-20, 2016, pp. 1-5.

ZTE, "WF on Timing of NB-PDCCH and NB-PDSCH/PUSCHfor NB-IoT", R1-160209, 3GPP TSG RAN WG1 NB-IoT Ad-Hoc Meeting, Budapest, Hungary, Jan. 18-20, 2016, pp. 1-4.

Intel Corporation, "On Downlink HARQ-ACK feedback for NB-IoT", R1-160133, 3GPP TSG RAN WG1 NB-IoT Ad-Hoc Meeting, Budapest, Hungary, Jan. 18-20, 2016, pp. 1-4.

* cited by examiner

METHOD FOR TRANSMITTING AND RECEIVING UPLINK SIGNAL FOR NB-IOT UE AND APPARATUS THEREFOR

CROSS REFERENCE TO RELATED APPLICATION

This application claims priority from Korean Patent Application Nos. 10-2016-0014509, 10-2016-0015050, 10-2016-0039529, and 10-2016-0117138, filed on Feb. 4, 2016, Feb. 5, 2016, Mar. 31, 2016, and Sep. 12, 2016, which are hereby incorporated by reference for all purposes as if fully set forth herein.

BACKGROUND

1. Field of the Disclosure

The present disclosure relates to an uplink transmission/reception technology of a Narrow Band Internet of Things (NB-IoT) User Equipment (UE) in a $3^{rd}$ generation partnership project (3GPP) Long term evolution (LTE)/LTE-Advanced system. Particularly, the present disclosure relates to a detailed procedure for transmitting a HARQ ACK/NACK of an NB-IoT UE that transmits and receives data using a Narrow Band and a technology for configuring transmission resources.

2. Description of the Related Art

The number of Internet of Things (IoT) devices connected through networks is abruptly increasing worldwide. In this situation, it is required to develop a technology of processing data transmission and reception of IoT devices.

Specifically, many IoT devices are installed over a wide area and require low cost and stable network connectivity with low-power consumption. In addition, the IoT devices may have characteristics of intermittently transmitting and receiving a small amount of data. Therefore, when the typical LTE or LTE-Advanced technology is applied, there is a problem of an increase of unnecessary power consumption or a cost increase of the device itself. In addition, the typical technology has limitations on supporting communication with many IoT devices because wireless resources of licensed bands are limited.

To solve these problems, LongRange (LoRa), which is a dedicated network technology for IoT communication using unlicensed frequency bands, and a Narrow Band IoT (NB-IoT) technology based on the LTE network technology have been introduced.

Especially, NB-IoT performs communication using a narrow band to increase device acceptability and reduce the power consumption and the cost. In addition, the NB-IoT provides a coverage enhancement effect through a technology of data repetitive transmission. In addition, the NB-IoT may selectively or simultaneously apply a single tone or multi tone based data transmission method to each UE.

Therefore, in NB-IoT UEs having different transmission methods, it is required to new wireless resources and transmission timing for downlink data reception and uplink signal transmission as compared to the typical LTE technology.

SUMMARY

An embodiment made in view of the above background is to propose a method and apparatus for allocating transmission resources in time and frequency axis for transmitting uplink signals with respect to NB-IoT UEs having each different transmission schemes.

In addition, an embodiment of the present disclosure proposes a detailed procedure and method for transmitting HARQ ACK/NACK for downlink data when an NB-IoT UE receives the downlink data.

In order to solve the above problem, a method may be provided for transmitting an uplink signal by a Narrow Band Internet of things (IoT) UE. The method may include receiving, from a base station, uplink resource allocation information for transmitting HARQ ACK/NACK for downlink data, configuring a time-axis wireless resource and a frequency-axis wireless resource of an uplink signal including the HARQ ACK/NACK, based on the uplink resource allocation information, and transmitting the uplink signal through the time-axis wireless resource and frequency-axis wireless resource.

In accordance with another embodiment, a method may be provided for receiving an uplink signal by a base station. The method may include configuring uplink resource allocation information for receiving HARQ ACK/NACK for downlink data from a Narrow Band Internet of things (IoT) UE, transmitting the uplink resource allocation information and the downlink data to the Narrow-Band IoT UE, and receiving an uplink signal including the HARQ ACK/NACK through the time-axis wireless resource and frequency-axis wireless resource configured based on the uplink resource allocation information.

In accordance with still another embodiment, a Narrow Band Internet of things (IoT) UE may be provided for transmitting an uplink signal. The NB-IoT UE may include: a receiver configured to receive, from a base station, uplink resource allocation information for transmitting HARQ ACK/NACK for downlink data; a controller configured to configure a time-axis wireless resource and a frequency-axis wireless resource of an uplink signal including the HARQ ACK/NACK, based on the uplink resource allocation information; and a transmitter configured to transmit the uplink signal through the time-axis wireless resource and frequency-axis wireless resource.

In accordance with yet another embodiment, a base station may be provided for receiving an uplink signal. The base station may include: a controller configured to configure uplink resource allocation information for receiving HARQ ACK/NACK for downlink data from a Narrow Band Internet of things (IoT) UE; a transmitter configured to transmit the uplink resource allocation information and the downlink data to the Narrow-Band IoT UE; and a receiver configured to receive an uplink signal including the HARQ ACK/NACK through the time-axis wireless resource and frequency-axis wireless resource configured based on the uplink resource allocation information.

According to the embodiments, a method and apparatus may be provided for allocating transmission resources in time and frequency axis, which are to be used for transmitting uplink signals with respect to NB-IoT UEs having different transmission schemes.

According to embodiments, a detailed procedure and method may be provided for transmitting HARQ ACK/NACK for downlink data when an NB-IoT UE receives the downlink data.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE EXEMPLARY EMBODIMENTS

Figure 1:
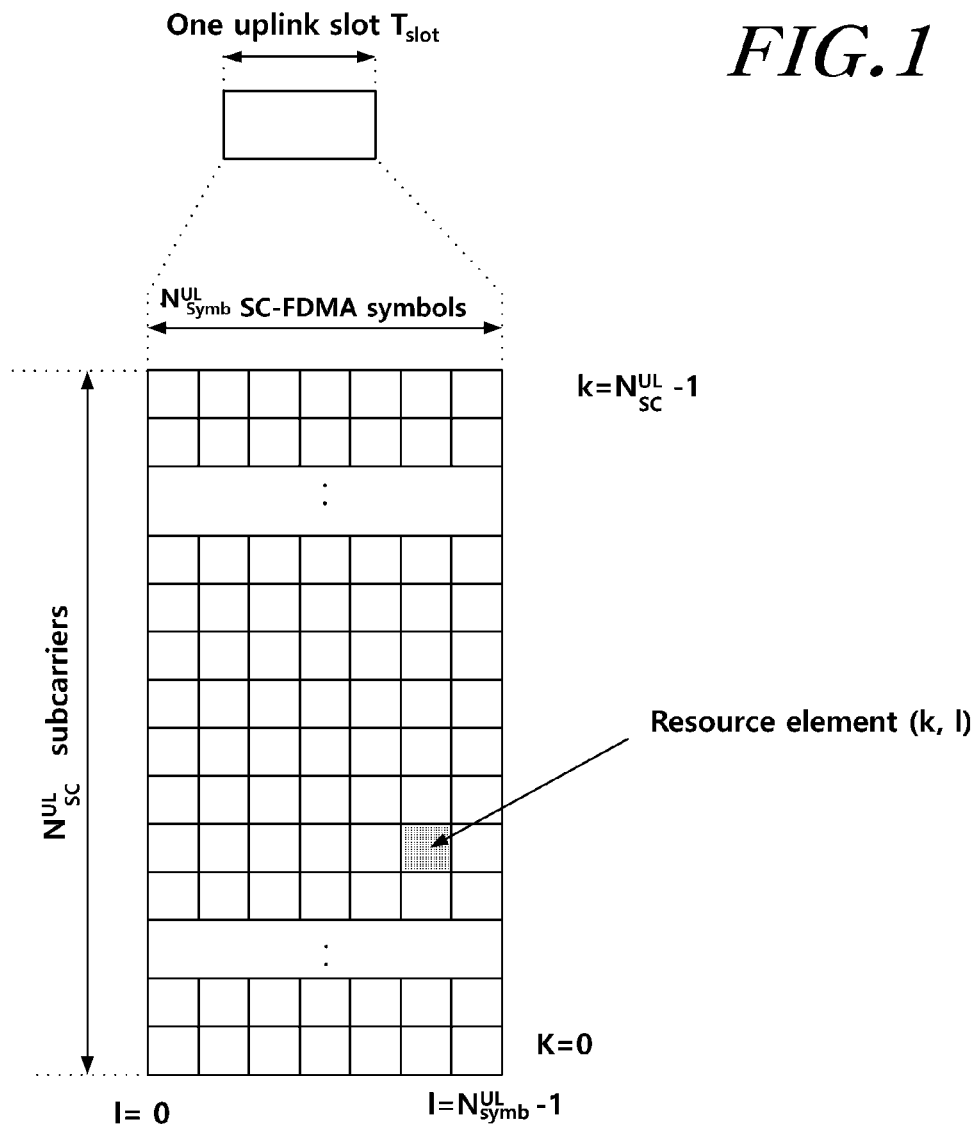
FIG. 1 is a diagram illustrating a wireless resource of NB-IoT UE.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present invention rather unclear.

In the present specifications, an machine type communication (MTC) terminal refers to a terminal supporting low cost and low complexity or supporting coverage enhancement. Alternatively, in the present specifications, the MTC terminal refers to a terminal that is defined as a predetermined category for maintaining low costs (or low complexity) and/or coverage enhancement.

In other words, in the present specifications, the MTC terminal may refer to a newly defined 3GPP Release 13 low cost (or low complexity) UE category/type, which executes LTE-based MTC related operations. Alternatively, in the present specifications, the MTC terminal may refer to a UE category/type that is defined in or before 3GPP Release-12 that supports the enhanced coverage in comparison with the existing LTE coverage, or supports low power consumption. The MTC terminal may also refer to a newly defined Release 13 low cost (or low complexity) UE category/type.

The wireless communication system may be widely installed to provide various communication services, such as a voice service, packet data, and the like. The wireless communication system may include a User Equipment (UE) and a Base Station (BS or an eNB). Throughout the specifications, the user equipment may be an inclusive concept indicating a user terminal utilized in wireless communication, including a UE (User Equipment) in wideband code division multiple access (WCDMA), LTE, high speed packet access (HSPA), and the like, and an MS (Mobile station), a UT (User Terminal), an SS (Subscriber Station), a wireless device, and the like in global systems for mobile communication (GSM).

A base station or a cell may generally refer to a station where communication with a User Equipment (UE) is performed. The base station or the cell may also be referred to as a Node-B, an evolved Node-B (eNB), a Sector, a Site, a Base Transceiver System (BTS), an Access Point, a Relay Node, a Remote Radio Head (RRH), a Radio Unit (RU), and the like.

That is, the base station 20 or the cell may be construed as an inclusive concept indicating a portion of an area covered by a BSC (Base Station Controller) in CDMA, a NodeB in WCDMA, an eNB or a sector (site) in LTE, and the like, and the concept may include various coverage areas, such as a megacell, a macrocell, a microcell, a picocell, a femtocell, a communication range of a relay node, and the like.

Each of the above mentioned various cells has a base station that controls a corresponding cell, and thus, the base station may be construed in two ways. (i) The base station may be a device itself that provides a megacell, a macrocell, a microcell, a picocell, a femtocell, and a small cell in association with a wireless area, or (ii) the base station may indicate a wireless area itself. In (i), all devices that interact with one another so as to enable the devices that provide a predetermined wireless area to be controlled by an identical entity or to cooperatively configure the wireless area may be indicated as a base station. Based on a configuration type of a wireless area, an eNB, an RRH, an antenna, an RU, a Low Power Node (LPN), a point, a transmission/reception point, a transmission point, a reception point, and the like may be embodiments of a base station. In (ii), a wireless area itself that receives or transmits a signal from a perspective of a terminal or a neighboring base station may be indicated as a base station.

Therefore, a megacell, a macrocell, a microcell, a picocell, a femtocell, a small cell, an RRH, an antenna, an RU, an LPN, a point, an eNB, a transmission/reception point, a transmission point, and a reception point are commonly referred to as a base station.

In the specifications, the user equipment and the base station are used as two inclusive transceiving subjects to embody the technology and technical concepts described in the specifications. The user equipment and the base station may not be limited to a predetermined term or word. In the specification, the user equipment and the base station are used as two (uplink or downlink) inclusive transceiving subjects to embody the technology and technical concepts described in the specifications, and the user equipment and the base station may not be limited to a predetermined term or word. Here, Uplink (UL) refers to a scheme for a UE to transmit and receive data to/from a base station, and Downlink (DL) refers to a scheme for a base station to transmit and receive data to/from a UE.

Various multiple access schemes may be unrestrictedly applied to the wireless communication system. Various multiple access schemes may include CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, OFDM-CDMA, and the like. Embodiments of the present disclosure may be applicable to resource allocation in an asynchronous wireless communication scheme that has been advanced through GSM, WCDMA, and HSPA, to be LTE and LTE-advanced. The embodiments may be applicable to resource allocation in a synchronous wireless communication scheme that has been advanced through CDMA and CDMA-2000, to be UMB. However, embodiments of the present disclosure may not be limited to a specific wireless communication field and may include all technical fields in which the technical idea of the present disclosure is applicable.

Uplink transmission and downlink transmission may be performed based on a TDD (Time Division Duplex) scheme that performs transmission based on different times or based on an FDD (Frequency Division Duplex) scheme that performs transmission based on different frequencies.

Further, in a system such as LTE and LTE-A, a standard may be developed by configuring an uplink and a downlink based on a single carrier or a pair of carriers. The uplink and the downlink may transmit control information through a control channel, such as a PDCCH (Physical Downlink Control CHannel), a PCFICH (Physical Control Format Indicator CHannel), a PHICH (Physical Hybrid ARQ Indicator CHannel), a PUCCH (Physical Uplink Control CHannel), an EPDCCH (Enhanced Physical Downlink Control CHannel), and the like, and may be configured as a data channel, such as a PDSCH (Physical Downlink Shared CHannel), a PUSCH (Physical Uplink Shared CHannel), and the like, so as to transmit data.

On the other hand, control information may be transmitted using an EPDCCH (enhanced PDCCH or extended PDCCH).

In the present specification, a cell may refer to the coverage of a signal transmitted from a transmission/reception point, a component carrier having the coverage of the signal transmitted from the transmission/reception point (transmission point or transmission/reception point), or the transmission/reception point itself.

A wireless communication system according to embodiments refers to a Coordinated Multi-point transmission/reception (CoMP) system, a coordinated multi-antenna transmission system, or a coordinated multi-cell communication system, where two or more transmission/reception points cooperatively transmit a signal. A CoMP system may include at least two multi-transmission/reception points and terminals.

A multi-transmission/reception point may be a base station or a macro cell (hereinafter, referred to as an 'eNB') and at least one RRH that is connected to the eNB through an optical cable or an optical fiber and is wiredly controlled, and has a high transmission power or a low transmission power within a macro cell area.

Hereinafter, a downlink refers to communication or a communication path from a multi-transmission/reception point to a terminal, and an uplink refers to communication or a communication path from a terminal to a multi-transmission/reception point. In a downlink, a transmitter may be a part of a multiple transmission/reception point and a receiver may be a part of a terminal. In an uplink, a transmitter may be a part of a terminal and a receiver may be a part of a multiple transmission/reception point.

Hereinafter, the situation in which a signal is transmitted and received through a PUCCH, a PUSCH, a PDCCH, a PDSCH, or the like may be described through the expression, "a PUCCH, a PUSCH, a PDCCH, or a PDSCH is transmitted or received".

In addition, hereinafter, the expression "a PDCCH is transmitted or received, or a signal is transmitted or received through a PDCCH" includes "an EPDCCH is transmitted or received, or a signal is transmitted or received through an EPDCCH".

That is, a physical downlink control channel used herein may indicate a PDCCH or an EPDCCH. The physical downlink control channel may also indicate a meaning including both a PDCCH and an EPDCCH.

In addition, for ease of description, an EPDCCH may be applied to embodiments described using a PDCCH and to embodiments described using an EPDCCH.

Meanwhile, higher layer signaling includes RRC signaling that transmits RRC information including an RRC parameter in the specification.

An eNB executes downlink transmission to terminals. The eNB may transmit a Physical Downlink Shared Channel (PDSCH) which is a primary physical channel for unicast transmission. The eNB may also transmit a Physical Downlink Control Channel (PDCCH) for transmitting downlink control information, such as scheduling required for reception of a PDSCH, and scheduling grant information for transmission of an uplink data channel (for example, a Physical Uplink Shared Channel (PUSCH)). Hereinafter, transmission and reception of a signal through each channel will be described as transmission and reception of a corresponding channel.

Hereinafter, a HARQ ACK/NACK feedback transmission method for downlink data reception by a Narrowband Internet of Things (NB-IoT) UE in an LTE or LTE-Advanced system in accordance with embodiments will be described.

In the present specification, a terminal that transmits and receives data using a narrow bandwidth is described as a Narrow Band IoT (NB-IoT) UE. The NB-IoT UE refers to a terminal that transmits and receives data using a narrow bandwidth than a typical LTE or LTE-Advanced terminal. The NB-IoT UE includes various names such as an MTC terminal. Therefore, the name of the NB-IoT UE is given for convenience and ease of understanding. However, embodiments are not limited thereto.

To distinguish a typical LTE-related channel from a channel used in the NB-IoT UE, "N" will be attached in front of a channel name for the NB-IoT. For example, a PDCCH is a downlink control channel in the LTE system and a NPDCCH is a downlink control channel in the NB-IoT. In addition, "N" will be also attached in front of information name, such as system information and signals, for the NB-IoT.

Hereinafter, NB-IoT technology will be briefly described based on related documents in 3GPP.

[NB-IoT]

The objective is to specify a radio access for cellular internet of things, based to a great extent on a non-backward-compatible variant of E-UTRA, which addresses improved indoor coverage, support for a massive number of low throughput devices, low delay sensitivity, ultra low device cost, low device power consumption, and (optimised) network architecture.

NB-IoT supports three operating modes as follows.

1. 'Stand-alone operation' utilizing for example the spectrum currently being used by GERAN systems as a replacement of one or more GSM carriers 2. 'Guard band operation' utilizing the unused resource blocks within an LTE carrier's guard-band 3. 'In-band operation' utilizing resource blocks within a normal LTE carrier As described above, the NB-IoT UE may operate independently and operate in a band configured as a guard band of the bandwidth. In addition, the NB-IoT may operate not only in the guard band but also in a band in which the general LTE UE operates.

Specifically, the NB-IoT UE supports the following operation.

180 kHz UE RF bandwidth for both downlink and uplink
 OFDMA on the downlink
  Two numerology options will be considered for inclusion: 15 kHz sub-carrier spacing (with normal or extended CP) and 3.75 kHz sub-carrier spacing. Technical analysis will either perform a down-selection or decide on inclusion of both based on the feasibility of meeting relevant requirements while achieving commonality (to be finalized by RAN #70)

For the uplink, two options will be considered: FDMA with GMSK modulation (as described in 3GPP TR 45.820 section 7.3), and SC-FDMA (including single-tone transmission as a special case of SC-FDMA)

Technical analysis will either perform a down-selection or decide on inclusion of both A single synchronization signal design for the different modes of operation, including techniques to handle overlap with legacy LTE signals MAC, RLC, PDCP and RRC procedures based on existing LTE procedures and protocols and relevant optimisations to support the selected physical layer Any enhancements to S1 interface to CN and related radio protocols to support the work SA2 is conducting on the systems aspects such as signalling reduction for small data transmissions.

As described above, the NB-IoT UE may transmit and receive the downlink signal and uplink signal to and from the base station in a narrower bandwidth as compared with the conventional general LTE UE.

In addition, the NB-IoT UE may transmit the uplink signal through single tone transmission and multi-tone transmission, which will be described below.

Single-tone transmissions are supported
  2 numerologies should be configurable for Single-tone transmission: 3.75 kHz and 15 kHz
  A cyclic prefix is inserted
  Frequency domain Sin c pulse shaping in the physical layer description
Multi-tone transmissions are supported
  Multi-tone transmissions are based on SC-FDMA
  15 kHz UL subcarrier spacing
  Additional mechanisms for PAPR reduction FFS
  The UE shall indicate the support of Single-tone and/or Multi-tone FIG. 1 is a diagram illustrating a wireless resource of NB-IoT UE.

Referring to FIG. 1, the NB-IoT UE transmits and receives uplink and downlink signals using a 180 kHz bandwidth. For example, in case of the uplink, a resource element or a resource unit may be defined in the NB-IoT. The resource element may be defined as an index pair including a subcarrier index and a symbol index, such as (k, l). That is, one uplink slot ($T_{slot}$) may be configured by $N_{symb}^{UL}$ number of SC-FDMA symbols in a time axis. In addition, $N_{SC}^{UL}$ number of subcarriers in a frequency axis may configure one bandwidth. As described above, the NB-IoT may process the uplink and downlink signals using 180 kHz. In addition, each subcarrier may be defined as 15 kHz or 3.75 kHz. Therefore, when each subcarrier is allocated at 15 kHz intervals, 12 subcarriers may configure one bandwidth. When subcarriers spacing is 3.75 kHz, a maximum of 48 subcarriers may configure one bandwidth. In addition, one uplink slot may include 7 symbols.

On the other hand, the resource unit may be used for uplink data transmission. The resource unit may be configured by one or more subcarriers and $2^n$ slots according to the size of subcarriers.

Meanwhile, as described above, the NB-IoT UE may support i) single tone transmission applied with two numerologies based on 3.75 kHz or 15 kHz and ii) multi-tone transmission using 15 kHz spacing based on SCK-FDMA. That is, for the uplink transmission of the NB-IoT UE, a single tone-based uplink transmission method and a multi tone-based uplink transmission method may be selectively applied by each UE.

In addition, when the single tone-based transmission is performed, uplink numerology based on 3.75 kHz subcarrier spacing and uplink numerology based on 15 kHz sub-carrier spacing may be configured, respectively.

Thus, when different uplink numerologies are respectively applied to NB-IoT UEs, it is required to newly define a method for allocating resources for HARQ ACK/NACK feedback to the base station for downlink data reception of the NB-IoT UE.

Hereinafter, HARQ ACK/NACK feedback methods of the NB-IoT UE will be described according to each embodiment.

Figure 2:
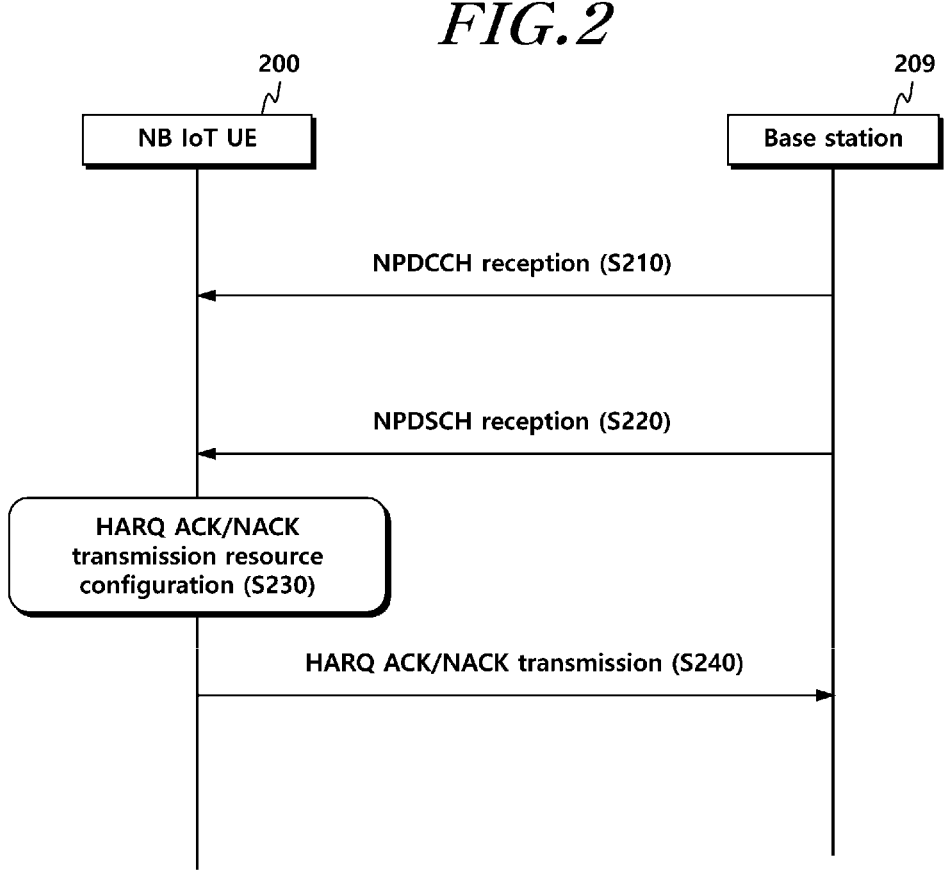
FIG. 2 is a signal diagram illustrating an operation of transmitting downlink data and uplink signal according to an embodiment.

FIG. 2 is a signal diagram illustrating an operation of transmitting downlink data and uplink signal according to an embodiment.

Referring to FIG. 2, the NB-IoT UE 200 receives a downlink control channel (NPDCCH) including downlink control information from the base station 209 in S210. The NPDCCH may be repeatedly received in one or more sub-frames or slots. Accordingly, the NB-IoT UE 200 may obtain the coverage expansion effect. The NPDCCH transmits downlink control information for the UE. In addition, the downlink control information may include at least one of downlink resource allocation information for the reception of downlink data, uplink resource allocation information for HARQ ACK/NACK, and control information.

After receiving the NPDCCH from the base station 209, the NB-IoT UE 200 receives the downlink data channel (NPDSCH) using the downlink resource allocation information included in the downlink control information in S220. The downlink data channel may be repeatedly received like the downlink control channel. The NB-IoT UE 200 decodes the downlink data channel and receives the downlink data.

When the reception of the downlink data has been completed, the NB-IoT UE 200 needs to transmit, to the base station 209, information on whether the downlink data has been successfully received. To this end, a transmission resource for HARQ ACK/NACK is configured using uplink resource allocation information included in downlink control information in S230. For example, the transmission resource may be configured by a time-axis wireless resource and a frequency-axis wireless resource. Specifically, the frequency-axis wireless resource may include specific subcarrier index information, and the time-axis wireless resource may include sub-frame information for HARQ ACK/NACK transmission after receiving the NPDSCH.

Then, the NB-IoT UE 200 transmits, to the base station 209, an uplink signal including HARQ ACK/NACK information in the configured transmission resource in S240. The uplink signal may be repeatedly transmitted, if necessary.

Hereinafter, each embodiment of a method for configuring a transmission resource for transmitting an HARQ ACK/NACK by the NB-IoT UE will be described with reference to FIG. 2. Hereinafter, DL HARQ ACK/NACK denotes HARQ ACK/NACK transmitted from a NB-IoT terminal to a base station for the downlink data First Embodiment: Cell-Specific Subcarrier Allocation for HARQ ACK/NACK Feedback A base station may allocate uplink resources for DL HARQ ACK/NACK feedback and transmit the DL HARQ ACK/NACK feedback to the NB-IoT UEs in a corresponding cell through cell-specific upper layer signaling. For example, when the DL HARQ ACK/NACK feedback is defined to be transmitted based on a single-tone, a single subcarrier index may be allocated for the corresponding DL HARQ ACK/NACK feedback. In this case, the NB-IoT UE may receive the downlink data and then perform feedback of the HARQ ACK/NACK through a subcarrier allocated in the uplink sub-frame after a predetermined number of sub-frames. Here, a gap between a downlink data reception timing and a HARQ ACK/NACK feedback timing may have an arbitrary fixed value (for example, 4). Such a gap may be configured in the base station together with the corresponding tone index allocation information, to be allocated through cell-specific higher layer signaling.

Alternatively, two subcarriers may be allocated through cell-specific RRC signaling for DL HARQ ACK/NACK feedback, and a corresponding HARQ ACK/NACK feedback transmission may be performed through one of two subcarriers according to the lowest CCE index used to transmit downlink control information (e.g., DL assignment DCI) for NPDSCH. For example, when the lowest CCE index is 0, the corresponding ACK/NACK feedback transmission may be performed through the first allocated subcarrier, and when the lowest CCE index is 1, the corresponding ACK/NACK feedback transmission may be performed through the second allocated subcarrier. Alternatively, a subcarrier for transmitting an actual HARQ ACK/NACK may be selected from subcarriers for HARQ ACK/NACK feedback allocated as a function of the lowest subcarrier index used to transmit downlink data.

Alternatively, two or more subcarrier indices may be allocated as subcarriers for HARQ ACK/NACK feedback of the NB-IoT UE through the cell-specific higher layer signaling, and a subcarrier to be actually used by the UE among the subcarriers may be determined as a function of the lowest CCE index and a downlink subcarrier index that is used for the NPDSCH reception. The subcarrier may refer to a subcarrier index to be used for the corresponding HARQ ACK/NACK feedback for the NPDSCH assignment DCI. Alternatively, an uplink subcarrier index (or indices) for HARQ ACK/NACK feedback may be allocated for each coverage level of the NB-IoT UE, and the HARQ ACK/NACK feedback for NPDSCH reception may be transmitted through the corresponding uplink subcarrier according to the coverage level of the corresponding NB-IoT UE.

Additionally, a multi-tone based HARQ ACK/NACK feedback transmission method may be defined for an NB-IoT UE supporting uplink multi-tone transmission, as well as a single-tone based HARQ ACK/NACK feedback transmission method. In case of the multi-tone based HARQ ACK/NACK feedback transmission method, the base station may configure sub-carrier indices for the corresponding multi-tone based HARQ ACK/NACK feedback additionally from the above described single-tone based HARQ ACK/NACK feedback subcarrier and allocate the same through the cell-specific higher layer signaling. In this case, the NB-IoT UE employing the multi-tone transmission may perform feedback of the HARQ ACK/NACK based on the corresponding multi-tone. When a plurality of multi-tone subcarrier groups is allocated, the corresponding NB-IoT UE may select a subcarrier group to be used for actually transmitting the ACK/NACK feedback in the same manner as the subcarrier selection method for the HARQ ACK/NACK feedback based on the single tone described above.

Additionally, when the corresponding HARQ ACK/NACK feedback subcarrier index (or indices) is allocated through the cell-specific higher layer signaling, the base station may include HARQ ACK/NACK feedback sub-frame allocation information for performing the corresponding HARQ ACK/NACK feedback. That is, the base station may allocate a time-axis wireless resource which will be used for transmitting the HARQ ACK/NACK. In this case, each NB-IoT UE may be configured to perform DL HARQ ACK/NACK feedback for the downlink data through the first available HARQ ACK/NACK feedback sub-frame after a predetermined processing time has elapsed.

Alternatively, the HARQ ACK/NACK feedback sub-frame may be determined to be calculated as a function of the numerology, coverage level, SFN value, and sub-frame index of the corresponding NB-IoT UE.

Second Embodiment: A Method for Using a Fixed Tone Index

For DL HARQ ACK/NACK feedback of the NB-IoT UE, a fixed subcarrier of the uplink sub-frame may be pre-configured for the corresponding HARQ ACK/NACK feedback.

For example, the highest subcarrier (e.g., a subcarrier #0) of the uplink sub-frame, may be dedicatedly allocated for the corresponding DL HARQ ACK/NACK feedback, or the last subcarrier (e.g., subcarrier #11 in case of 3.75 kHz subcarrier spacing, subcarrier #47 in case of 15 kHz subcarrier spacing) may be dedicatedly allocated for the corresponding HARQ ACK/NACK feedback.

Alternatively, subcarriers at both ends in an uplink band (i.e., PRB) of a corresponding NB-IoT UE may be allocated for the corresponding HARQ ACK/NACK feedback. A subcarrier index to be used for a corresponding DL HARQ ACK/NACK feedback may be determined as the lowest CCE index value associated with DL assignment of a UE or as a function of the lowest CCE index used for transmitting the NPDSCH.

Alternatively, for each cell, a subcarrier (or tone) index for DL HARQ ACK/NACK feedback may be determined as a function of cell ID. Alternatively, candidate subcarrier (or tone) indices for a plurality of DL HARQ ACK/NACK feedbacks are determined as a function of the cell ID, and a subcarrier index for DL HARQ ACK/NACK feedback to be used by each NB-IoT UE, among the subcarrier indices, may be determined as a function of the lowest CCE index used for transmission of DL assignment DCI or the lowest subcarrier index used for the NPDSCH transmission, or may allow the corresponding indication information to be included in the DL assignment DCI for the corresponding NPDSCH. For example, it may be defined as follows. In case of 15 kHz subcarrier spacing, HARQ ACK/NACK feedback transmission of NB-IoT UE in a corresponding cell is performed through subcarrier # (Cell_ID mod 12). In case of 3.75 kHz subcarrier spacing, HARQ ACK/NACK feedback transmission of NB-IoT UE in a corresponding cell is performed through subcarrier # (Cell_ID mod 48).

Alternatively, similar to the method described in the first embodiment, an uplink subcarrier index for HARQ ACK/NACK feedback transmission may be determined, for each coverage level of the NB-IoT UE, as a function of the coverage level including the NB-IoT UE. Alternatively, the uplink subcarrier index for HARQ ACK/NACK feedback transmission for each coverage level in the corresponding NB-IoT cell may be determined as a function of the NB-IoT cell ID and coverage level.

In addition, in the present embodiment, when the multi-tone based HARQ ACK/NACK feedback transmission method is additionally applied similar to the first embodiment, the subcarrier indices to be used for the corresponding multi-tone based HARQ ACK/NACK may be determined in the same manner as in the case of above described single-tone.

Alternatively, a predetermined subcarrier may be dedicatedly assigned to each NB-IoT UE for HARQ ACK/NACK feedback according to the coverage level of the corresponding NB-IoT UE.

In addition, similar to the first embodiment, HARQ ACK/NACK feedback may be configured through some subsets of the uplink sub-frame, not through all the uplink sub-frames. In this case, similar to the first embodiment described above, the base station may include the HARQ ACK/NACK feedback sub-frame allocation information for performing HARQ ACK/NACK feedback through the cell-specific higher layer signaling, or the base station may be implicitly determined therein.

In this case, when a predetermined time has elapsed after receiving the downlink data, each NB-IoT UE may perform DL HARQ ACK/NACK feedback for the downlink data through the first available HARQ ACK/NACK feedback sub-frame. Alternatively, when the corresponding cell-specific HARQ ACK/NACK feedback subcarrier is allocated, the base station may configure a timing gap between the NPDSCH reception and the corresponding HARQ ACK/NACK feedback, and the base station may perform signaling of the same. The time gap refers to a sub-frame offset.

Third Embodiment: A Method for Configuring Dedicated HARQ ACK/NACK Feedback Subcarrier Allocation Information Through UE-Specific RRC Signaling The uplink resource allocation information for DL HARQ ACK/NACK feedback of the NB-IoT UE may be allocated to each NB-IoT UE through UE-specific RRC signaling.

That is, dedicated HARQ ACK/NACK feedback uplink resource allocation for HARQ ACK/NACK feedback may be performed for each NB-IoT UE. In this case, the dedicated HARQ ACK/NACK feedback uplink resource allocation information may include at least one of sub-frame allocation information (e.g., a subcarrier index, or subcarrier indices when uplink multi-tone transmission is supported), sub-frame allocation information for HARQ ACK/NACK feedback (e.g., offset/duration information or period information or bitmap-based HARQ ACK/NACK feedback sub-frame allocation information), and sub-frame offset information between the NPDSCH reception and the HARQ ACK/NACK feedback.

Alternatively, the uplink resource allocation information for corresponding dedicated HARQ ACK/NACK feedback may include only the corresponding subcarrier index allocation information (or subcarrier indices when uplink multi-tone transmission is supported), and after receiving the NPDSCH, the HARQ ACK/NACK feedback transmission may be performed through a subcarrier allocated in an uplink sub-frame after a fixed sub-frame offset (for example, 4 sub-frames).

Alternatively, when a single uplink signal transmission resource for the HARQ ACK/NACK feedback is configured through a plurality of sub-frames, the uplink resource allocation information may include sub-frame duration information together with the corresponding subcarrier index (or subcarrier indices when the uplink multi-tone transmission is supported).

Alternatively, when the HARQ ACK/NACK feedback transmission is performed, in which the transmission spread is performed based on OCC or pseudo random sequence, the corresponding sequence allocation information may be further included in the uplink resource allocation information.

Alternatively, the base station may allocate a plurality of HARQ ACK/NACK feedback subcarrier indices through the corresponding UE-specific RRC signaling, and the subcarrier index information to be used for the actual HARQ ACK/NACK feedback may be indicated to the UE through the downlink control information (DL assignment DCI).

Fourth Embodiment: Implicit Mapping Method

The uplink resource may be implicitly configured without additional explicit signaling for uplink resource configuration for DL HARQ ACK/NACK feedback HARQ ACK/NACK feedback of an NB-IoT UE in the base station or network.

For example, the uplink subcarrier index (or indices) for DL HARQ ACK/NACK feedback transmission may be determined through a preconfigured function that uses, as a parameter, at least one of a downlink subcarrier index used for the NPDSCH transmission, a CCE index used for the downlink control information transmission, an ID of the corresponding cell, and an uplink sub-frame index (or indices) used for HARQ ACK/NACK feedback transmission.

However, when NPDCCH and NPDSCH transmission is performed repeatedly in order to improve the coverage of the NB-IoT UE, the subcarrier index of the uplink signal for corresponding DL HARQ ACK/NACK feedback transmission may be determined using a preconfigured function that uses, as a parameter, at least one of i) the CCE index (or lowest CCE index) of the NPDCCH in which the last repetitive transmission has been performed, ii) the sub-frame index of the NPDCCH in which the last repetitive transmission has been performed, iii) a subcarrier index or a sub-frame index of the NPDSCH in which the last repetitive transmission was performed, iv) an ID of the corresponding cell, v) a C-RNTI of the NB-IoT UE, vi) a temporary C-RNTI of the NB-IoT UE, vii) a subcarrier spacing value, and viii) a K value, which is the number of uplink subcarriers for configuring one NB-IoT uplink bandwidth (for example, K=12 in case of 15 kHz subcarrier spacing, and K=48 in case of 3.75 kHz subcarrier spacing).

Alternatively, a baseline subcarrier index of the uplink signal for HARQ ACK/NACK feedback transmission may be determined using a predetermined function that uses, as a parameter, at least one of i) the CCE index (or lowest CCE index) of the NPDCCH in which the last repetitive transmission has been performed, ii) the sub-frame index of the NPDCCH in which the last repetitive transmission has been performed, iii) a subcarrier index or a sub-frame index of the NPDSCH in which the last repetitive transmission has been performed, iv) an ID of the corresponding cell, v) a C-RNTI of the NB-IoT UE, vi) a temporary C-RNTI of the NB-IoT UE, vii) a subcarrier spacing value, and viii) a K value, which is the number of uplink subcarriers for configuring one NB-IoT uplink bandwidth (for example, K=12 in case of 15 kHz subcarrier spacing, and K=48 in case of 3.75 kHz subcarrier spacing). In addition, the subcarrier index of the uplink signal for the HARQ ACK/NACK feedback may be finally determined by transmitting the subcarrier offset value from the corresponding baseline subcarrier index through the downlink control information (DL assignment DCI).

Fifth Embodiment: A Method for Dynamically Transmitting, by a Base Station, Resource Allocation Information of an Uplink Signal for Dynamic HARQ ACK/NACK Feedback The base station may dynamically schedule uplink resources for DL HARQ ACK/NACK feedback of the NB-IoT UE.

For example, when transmitting the downlink control information (DL assignment DCI), the base station may include the uplink resource allocation information for DL HARQ ACK/NACK feedback in the downlink control information and transmit the same. Alternatively, the base station may piggyback the scheduling information on the uplink resources for DL HARQ ACK/NACK feedback through the NPDSCH allocated by the downlink control information and transmit the same. Alternatively, the base station may transmit uplink resource allocation information for DL HARQ ACK/NACK feedback through additional NPDCCH which is different from an NPDCCH including downlink control information. In this case, the transmission sub-frame of the additional NPDCCH that includes the corresponding HARQ ACK/NACK grant DCI may be transmitted through the next sub-frame after a sub-frame of completing transmission of the DL assignment DCI for the downlink data. Or, the transmission sub-frame may be transmitted through the next sub-frame after a sub-frame of completing the NPDSCH transmission.

The uplink resource allocation information for HARQ ACK/NACK may include at least one of subcarrier allocation information, sub-frame allocation information, and sequence allocation information. For example, the uplink resource allocation information for HARQ ACK/NACK may include at least one of subcarrier index (or indices) information, HARQ ACK/NACK feedback transmission sub-frame allocation information, and sequence allocation information for HARQ ACK/NACK feedback.

In another example, the base station may allocate a subcarrier index (or indices), determined in the first embodiment or second embodiment, to a baseline subcarrier of an uplink signal for HARQ ACK/NACK feedback transmission for NPDSCH reception. When the NPDSCH scheduling for an arbitrary NB-IoT UE is performed, the base station may additionally transmit a subcarrier offset value from the baseline subcarrier in order to allocate subcarriers for HARQ ACK/NACK feedback transmission of the corresponding NB-IoT UE. That is, the base station may configure a subcarrier offset value from a corresponding baseline subcarrier. The base station may transmit the same through a DL assignment DCI that transmits NPDSCH scheduling information for an arbitrary NB-IoT UE. The NB-IoT UE may transmit an uplink signal including HARQ ACK/NACK feedback for the corresponding NPDSCH reception through a subcarrier that is separated from the corresponding baseline subcarrier by the subcarrier offset value. In this case, the corresponding baseline subcarrier index may be set as a single uplink baseline subcarrier for HARQ ACK/NACK feedback transmission for each NB-IoT cell. At this time, a single baseline subcarrier may have a subcarrier index, configured for each NB-IoT cell, and transmitted through cell-specific or UE-specific higher layer signaling. Alternatively, a single baseline subcarrier index of the corresponding cell may be determined using a function that uses, as a parameter, at least one of i) the corresponding NB-IoT cell ID value, ii) the subcarrier spacing value, and iii) K value which is the number of uplink subcarriers configuring one NB-IoT uplink bandwidth (for example, K=12 in case of 15 kHz subcarrier spacing, and K=48 in case of 3.75 kHz subcarrier spacing).

As an example of a function for determining a baseline subcarrier, when a cell ID value of an arbitrary NB-IoT cell is referred to as $N_{ID}^{cell}$, baseline subcarrier index #i of a corresponding cell may be defined by Equation 1 as follows.

$$i = N_{ID}^{cell} \bmod N \qquad \text{[Equation 1]}$$

Here, N may be a predetermined value.

As another example, a function for determining the baseline subcarrier index may be defined by Equation 2 according to a reuse factor, R value, of the baseline subcarrier index.

$$i = \left(\frac{K}{R}\right) \times (N_{ID}^{cell} \bmod R) \qquad \text{[Equation 2]}$$

For example, when the reuse factor R value is defined as 3, the baseline subcarrier index in an arbitrary NB-IoT cell becomes i=(K/3)×(mod 3) according to a cell cell ID value, $N_{ID}^{cell}$ of the corresponding cell.

The equations 1 and 2 have exemplary described as a function using $N_{ID}^{cell}$ or K value as a factor. However, the embodiments of the present disclosure are not limited thereto. For example, another function formula using $N_{ID}^{cell}$ or K value may be used.

On the other hand, the above-described baseline subcarrier index may be a fixed value. For example, the subcarrier index #0 may be preconfigured as a baseline subcarrier index and stored regardless of the cell ID or K value.

Alternatively, as another method for determining the baseline subcarrier index, a plurality of baseline subcarrier indices may be defined within a single NB-IoT cell. For example, an additional baseline subcarrier index may be configured according to the coverage level of each NB-IoT UE within a single NB-IoT cell. In this case, the base station may configure an additional baseline subcarrier index for each coverage level, and the base station may transmit the same to the NB-IoT UE through the cell-specific or UE-if) specific RRC signaling. Alternatively, similar to the above-described single baseline subcarrier configuring method, a baseline subcarrier index for each corresponding coverage level may be determined using a function that uses, as a parameter, at least one of i) the corresponding NB-IoT cell ID value, ii) the subcarrier spacing value, and iii) K value which is the number of uplink subcarriers configuring one NB-IoT uplink bandwidth (for example, K=12 in case of 15 kHz subcarrier spacing, and K=48 in case of 3.75 kHz subcarrier spacing), and the coverage level of the corresponding NB-IoT UE. For example, if the coverage level having n levels is defined in an arbitrary NB-IoT cell and the value of a coverage level of an arbitrary NB-IoT UE is referred to as L (=0, 1, 2, . . . , n−1), the corresponding baseline subcarrier index #i may be determined using a function of Equation 3 or Equation 4.

$$i = L + (N_{ID}^{cell} \bmod N) \qquad \text{[Equation 3]}$$

$$i = [K/n] \times L + (N_{ID}^{cell} \bmod R) \qquad \text{[Equation 4]}$$

In Equation 4, [a] may refer to the maximum integer not exceeding 'a'. However, Equation 3 or Equation 4 is only an exemplary function of a coverage level of cell an arbitrary NB-IoT UE and $N_{ID}^{cell}$ or K, which defines the corresponding baseline subcarrier index. However, the embodiments of the present disclosure are not limited thereto. For example, the embodiments of the present disclosure may use other function equation using, as a parameter, the corresponding coverage level, the L value and $N_{ID}^{cell}$ or K, and determining the corresponding baseline subcarrier index.

Meanwhile, an arbitrary fixed subcarrier index value for each coverage level may be determined as a fixed value to a baseline subcarrier index. For example, in case of 15 kHz subcarrier spacing, the baseline subcarrier for NB-IoT UE of the coverage level 0 is fixed to subcarrier index #0, the baseline subcarrier for NB-IoT UE of the coverage level 1 is fixed to subcarrier index #3, the baseline subcarrier for NB-IoT UE of the coverage level 2 is fixed to subcarrier index #6, and the baseline subcarrier for NB-IoT UE of coverage level 3 is fixed to subcarrier index #9. In case of 3.75 kHz subcarrier spacing, the baseline subcarrier for NB-IoT UE of the coverage level 0 is fixed to subcarrier index #0, the baseline subcarrier for NB-IoT UE of the coverage level 1 is fixed to subcarrier index #12, the baseline subcarrier for NB-IoT UE of the coverage level 2 is fixed to subcarrier index #24, and the baseline subcarrier for NB-IoT UE of coverage level 3 is fixed to subcarrier index #36.

As descried, the embodiments of the present disclosure are related to an uplink resource allocation method and apparatus for transmitting, by an NB-IoT UE, an uplink signal including DL HARQ ACK/NACK feedback. That is, the uplink resource allocation method and apparatus may be applied regardless of whether the HARQ ACK/NACK feedback information transmission is performed through the NPUCCH or the NPUSCH. That is, the HARQ ACK/NACK feedback resource allocation method described above may be applied regardless of whether the NPUCCH or NPUSCH is used as a detailed physical channel of the corresponding HARQ ACK/NACK feedback.

Hereinafter, unlink signal resource allocation operations of an NB-IoT UE and a base station for HARQ ACK/NACK transmission will be described.

Figure 3:
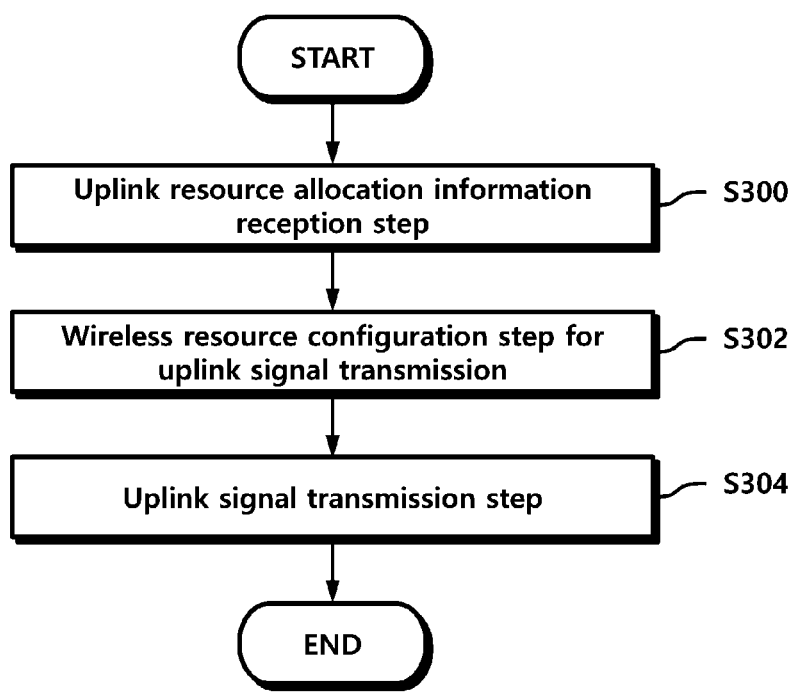
FIG. 3 is a diagram illustrating an operation of an NB-IoT UE according to an embodiment.

FIG. 3 is a diagram illustrating an operation of an NB-IoT UE according to an embodiment.

Referring to FIG. 3, an NB-IoT UE performs an operation of receiving uplink resource allocation information for transmitting HARQ ACK/NACK for downlink data from a base station in S300. The uplink resource allocation information may be received as being included in downlink control information. In addition, the uplink resource allocation information may be received through NPDCCH.

For example, the downlink control information included in the NPDCCH may include NPDSCH scheduling information for receiving downlink data and uplink resource allocation information for HARQ ACK/NACK transmission. In another example, the uplink resource allocation information may be received through an NPDCCH different from an NPDCCH that includes the NPDSCH scheduling information. In still another example, the uplink resource allocation information and the NPDSCH scheduling information may be received as being included in the same NPDCCH, and may be included in different fields in the downlink control information.

The NB-IoT UE performs an operation of configuring a time-axis wireless resource and a frequency-axis wireless resource of an uplink signal including HARQ ACK/NACK, based on the uplink resource allocation information, in S302. The uplink resource allocation information may include at least one of subcarrier allocation information, sub-frame allocation information, and sequence allocation information, which are allocated for the transmission of the HARQ ACK/NACK for downlink data.

For example, the subcarrier allocation information may include subcarrier index information as a frequency-axis wireless resource of an uplink resource for transmitting HARQ ACK/NACK The sub-frame allocation information may include at least one of sub-frame index information and system frame index information as a time-axis wireless resource of an uplink resource for transmitting HARQ ACK/NACK. Alternatively, the sub-frame allocation information may include sub-frame offset information as a time-axis wireless resource of an uplink resource for transmitting HARQ ACK/NACK The NB-IoT UE configures a time-axis wireless resource and a frequency-axis wireless resource for transmitting HARQ ACK/NACK using the uplink resource allocation information. As described above, the frequency-axis wireless resource is configured as one or more subcarrier indices indicated by subcarrier allocation information. The time-axis wireless resource is configured as a corresponding sub-frame index when the sub-frame allocation information includes a sub-frame index. Alternatively, when the sub-frame allocation information includes the sub-frame offset information, the time-axis wireless resource is determined based on information on the last sub-frame of repeatedly receiving the NPDSCH and the sub-frame offset information. For example, a sub-frame, spaced by a sub-frame offset, from the last sub-frame of repeatedly receiving the NPDSCH may be configured as a time-axis wireless resource for HARQ ACK/NACK transmission. Alternatively, a sub-frame, spaced by a predetermined natural number, from the sub-frame that is spaced by a sub-frame offset from the last sub-frame of repeatedly receiving the NPDSCH may be configured as the time-axis wireless resource for HARQ ACK/NACK transmission.

The NB-IoT UE performs an operation of transmitting an uplink signal through the wireless resources in the time axis and frequency axis in S304. The NB-IoT UE may transmit the uplink signal to the base station based on the configured subcarrier index and sub-frame information. As described above, the uplink signal including the HARQ ACK/NACK may be transmitted through wireless resources determined by uplink resource allocation information, and may be transmitted through the NPUCCH channel or NPUSCH channel.

Figure 4:
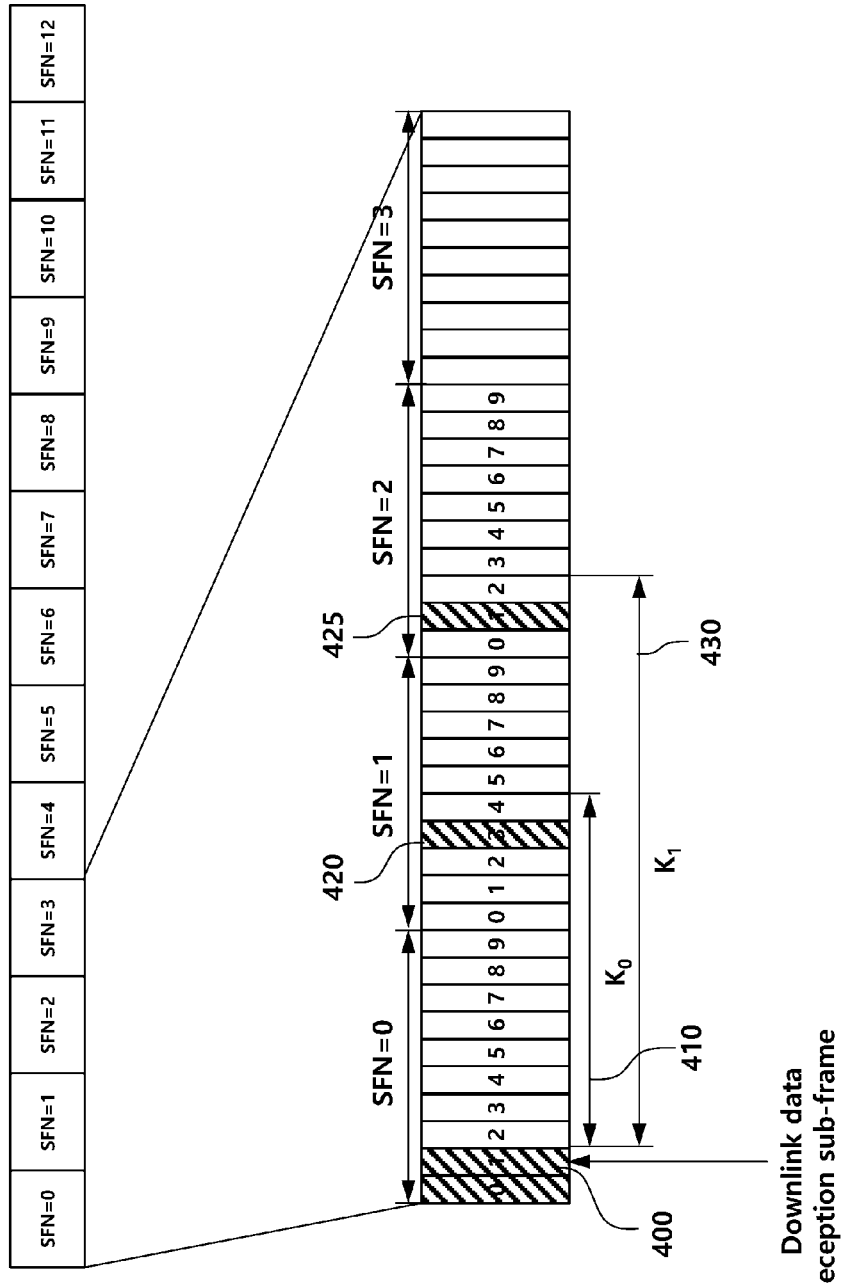
FIG. 4 is a diagram illustrating an operation of allocating a time-axis wireless resource for HARQ ACK/NACK transmission for downlink data according to an embodiment.

FIG. 4 is a diagram illustrating an operation of allocating a time-axis wireless resource to be used for HARQ ACK/NACK transmission for downlink data according to an embodiment.

Referring to FIG. 4, a method of configuring a time-axis wireless resource using uplink resource allocation information will be described. Referring to FIG. 4, the NB-IoT UE configures the time-axis wireless resource for HARQ ACK/NACK transmission, using sub-frame allocation information included in the uplink resource allocation information. Here, a case where sub-frame allocation information includes sub-frame offset information will be described as an example.

The time-axis wireless resource may be configured by applying sub-frame offset information 410 and 430 based on the last repetitive transmission sub-frame 400 of the NPDSCH in which the downlink data is received. For example, it may be determined as Equation 5 as follows.

Uplink signal transmission sub-frame for HARQ ACK/NACK=last sub-frame $n$ for NPDSCH repetitive transmission+Sub-frame allocation information$(K_n)$−$A$    [Equation 5]

In Equation 5, $A$ is a predetermined natural number, and may be configured as 1, for example.

For example, when the sub-frame offset information $K_1$ is allocated to 21, the time-axis wireless resource may be configured as the sub-frame 425 that is immediately before the 21st sub-frame in the last repetitive transmission sub-frame 400 of the NPDSCH in which the downlink data is received.

For another example, when the sub-frame offset information $K_0$ is allocated to 13, the time-axis wireless resource may be configured as the sub-frame 420 that is immediately before the 13rd sub-frame in the last repetitive transmission sub-frame 400 of the NPDSCH in which the downlink data is received.

The case where the sub-frame offset information is 13 or 21 is described as an example, and the sub-frame offset information may be changed according to the subcarrier spacing of the NB-IoT UE. Alternatively, the sub-frame offset information may be allocated according to the subcarrier spacing and subcarrier allocation information. In this case, the sub-frame offset information may be paired with the subcarrier allocation information and then included in the uplink resource allocation information, to be allocated to the NB-IoT UE.

Figure 5:
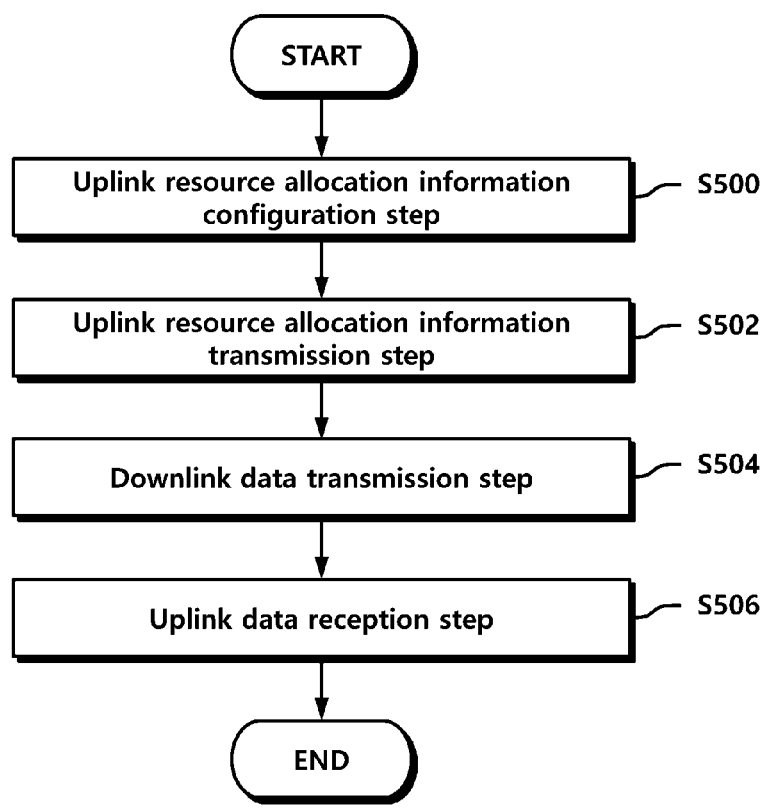
FIG. 5 is a diagram illustrating an operation of a base station according to an embodiment.

FIG. 5 is a diagram illustrating an operation of a base station according to an embodiment.

Referring to FIG. 5, a base station performs an operation of configuring uplink resource allocation information for receiving HARQ ACK/NACK for downlink data from the NB-IoT UE in S500. The base station configures uplink resource allocation information for receiving HARQ ACK/NACK to receive HARQ ACK/NACK for downlink data transmitted to the NB-IoT UE.

As described above, the uplink resource allocation information may include at least one of subcarrier allocation information, sub-frame allocation information, and sequence allocation information, which are allocated for the transmission of the HARQ ACK/NACK for the downlink data.

For example, the subcarrier allocation information may include subcarrier index information as a frequency-axis wireless resource of an uplink resource for transmitting the HARQ ACK/NACK The sub-frame allocation information may include at least one of sub-frame index information and system frame index information as time-axis wireless resources of the uplink resource for transmitting the HARQ ACK/NACK. Alternatively, the sub-frame allocation information may include sub-frame offset information as the time-axis wireless resource of the uplink resource for transmitting the HARQ ACK/NACK.

The base station may allocate the sub-frame allocation information and the subcarrier allocation information in pairs. In this case, the base station may configure pairs to have different values in consideration of the subcarrier spacing of the corresponding NB-IoT UE. For example, the subcarrier allocation information and sub-frame allocation information may be allocated in pairs of (38, 13), (39, 13), . . . , (44, 21), (45, 21), etc.

The base station performs steps of transmitting the uplink resource allocation information and downlink data to the NB-IoT UE in S502 and S504. The base station transmits the configured uplink resource allocation information to the NB-IoT UE, and transmits the downlink data through the NPDSCH. The uplink resource allocation information may be transmitted as being included in the downlink control information of the NPDCH. The downlink control information may include scheduling information of the NPDSCH. On the other hand, the order of steps S502 and S504 may be changed. For example, downlink data may be preferentially repeatedly transmitted through the NPDSCH, and uplink resource allocation information may be transmitted thereafter. Alternatively, the uplink resource allocation information may be transmitted together with the scheduling information of the NPDSCH.

The base station includes an operation of receiving an uplink signal including HARQ ACK/NACK through a time-axis wireless resource and a frequency-axis wireless resource, which are configured based on uplink resource allocation information, in S506. The base station may receive the uplink signal including the HARQ ACK/NACK from the NB-IoT UE through wireless resources allocated by the uplink resource allocation information. The uplink signal including HARQ ACK/NACK may be NPUSCH or NPUCCH. For example, the base station may receive HARQ ACK/NACK information included in the NPUSCH. The time-axis wireless resource of the uplink signal is the same as that described with reference to FIG. 4.

As described above, even when different subcarrier spacing is applied to each NB-IoT UE in the case of using the present embodiments, the base station may smoothly perform the HARQ operation, and the ambiguity of the HARQ ACK/NACK transmission by the NB-IoT UE and the base station may be prevented.

Hereinafter, the configurations of the NB-IoT UE and the base station according to embodiments will be described with reference to diagrams.

Figure 6:
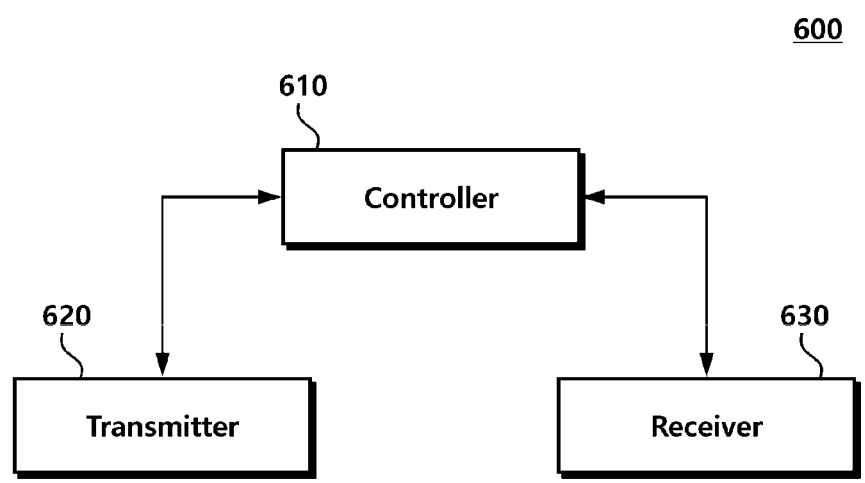
FIG. 6 is a diagram illustrating a configuration of an NB-IoT UE according to an embodiment.

FIG. 6 is a diagram illustrating an NB-IoT UE according to an embodiment.

Referring to FIG. 6, an NB-IoT UE 600 includes a receiver 630 for receiving, from a base station, uplink resource allocation information for transmitting HARQ ACK/NACK for downlink data, a controller 610 for configuring a time-axis wireless resource and a frequency-axis wireless resource of the uplink signal including HARQ ACK/NACK based on the uplink resource allocation information, and a transmitter 620 for transmitting the uplink signal through the time-axis wireless resource and frequency-axis wireless resource.

The receiver 630 receives downlink control information through the NPDCCH, and the downlink control information may include NPDSCH scheduling information or uplink resource allocation information. In addition, the receiver 630 receives downlink data through the NPDSCH. The downlink data may be received repeatedly through one or more sub-frames or slots.

The controller 610 checks uplink resource allocation information and configures a time-axis wireless resource and a frequency-axis frequency resource, which are used for transmitting the uplink signal including HARQ ACK/NACK information for the downlink data. The uplink resource allocation information may include at least one of subcarrier allocation information, sub-frame allocation information, and sequence allocation information, which are allocated for the transmission of the HARQ ACK/NACK for the downlink data. The subcarrier allocation information includes subcarrier index information, and the sub-frame allocation information may include sub-frame offset information. The subcarrier allocation information and the sub-frame allocation information may be received in pairs that are classified according to subcarrier spacing (e.g., 3.75 kHz or 15 kHz) of the NB-IoT UE 600.

The controller 610 configures the time-axis wireless resource based on the sub-frame allocation information and the last repetitive transmission sub-frame information of the NPDSCH for transmitting the downlink data. The frequency-axis wireless resource is configured by the subcarrier allocation information.

In addition, the controller 610 controls the overall operation of performing the DL HARQ ACK/NACK feedback procedure of the NB-IoT UE 600, which is required to perform the above-described embodiments.

Meanwhile, the transmitter 630 transmits the uplink signal including the HARQ ACK/NACK information to the base station, using configured wireless resources of the uplink signal. The uplink signal may be transmitted through the NPUSCH or NPUCCH.

In addition, the transmitter 620 and receiver 630 transmit and receive, to and from the base station, signals, messages, or data required for performing the above-described present embodiments.

Figure 7:
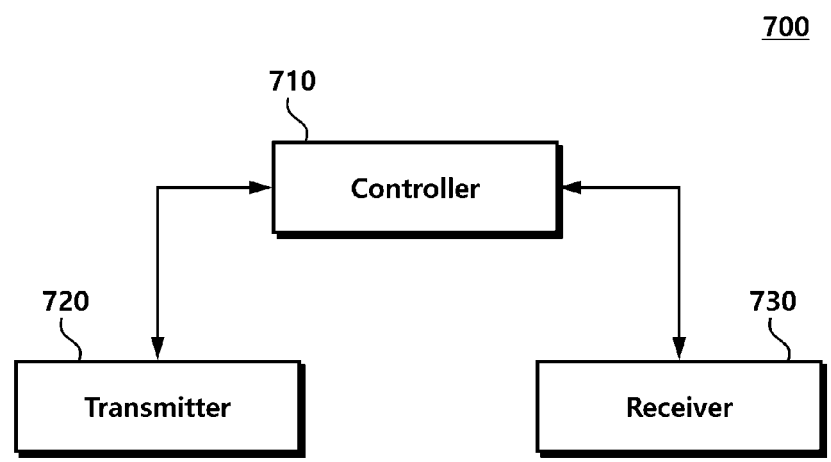
FIG. 7 is a diagram illustrating a configuration of a base station according to an embodiment.

FIG. 7 is a diagram illustrating a base station according to an embodiment.

Referring to FIG. 7, a base station 700 includes a controller 710 for configuring uplink resource allocation information for receiving HARQ ACK/NACK for downlink data from a Narrow-Band Internet of Things (IoT) UE, a transmitter 720 for transmitting uplink resource allocation information and downlink data to the Narrow-Band IoT UE, and a receiver 730 for receiving an uplink signal including HARQ ACK/NACK through the time-axis wireless resource and frequency-axis wireless resource configured on the basis of uplink resource allocation information.

The controller 710 controls downlink data transmission for each NB-IoT UE and configures uplink resource allocation information for receiving HARQ ACK/NACK for downlink data. As described above, the uplink resource allocation information may include at least one of subcarrier allocation information, sub-frame allocation information, and sequence allocation information, which are allocated for the transmission of the HARQ ACK/NACK for the downlink data. The subcarrier allocation information includes subcarrier index information, and the sub-frame allocation information may include sub-frame offset information. The subcarrier allocation information and the sub-frame allocation information may be configured in pairs that are classified according to subcarrier spacing (e.g., 3.75 kHz or 15 kHz) of the NB-IoT UE 600. In addition, the controller 710 controls the overall operation of the base station 700 for receiving the DL HARQ ACK/NACK feedback information of the NB-IoT UE, which is required to perform the above-described present embodiments.

The transmitter 720 transmits downlink control information including uplink resource allocation information or NPDSCH scheduling information through the NPDCCH. The downlink control information may be transmitted repeatedly through one or more sub-frames or slots. The transmitter 720 may transmit, if necessary, NPDSCH scheduling information and uplink resource allocation information through a separate NPDCCH.

The receiver 730 may receive an uplink signal including HARQ ACK/NACK information for downlink data through the NPUSCH or NPUCCH. The uplink signal may be repeatedly received by one or more sub-frames or slots.

Besides, the transmitter 720 and receiver 730 transmit and receive, to and from the NB-IoT UE, signals, messages, or data required for performing the above-described present embodiments.

Standard contents or standard documents mentioned in the above embodiment are omitted to simplify the description of the specification and constitute a part of the present specification. Therefore, it should be understood that adding some of the above standard contents and standard documents to the present specification or describing the same in claims are within the scope of the present disclosure.

Although a preferred embodiment of the present disclosure has been described for illustrative purposes, those skilled in the art will appreciate that various modifications, additions, and substitutions are possible without departing from the scope and spirit of the embodiments of the present disclosure as disclosed in the accompanying claims. Therefore, exemplary aspects of the present disclosure have not been described for limiting purposes. The scope of the present disclosure shall be construed based on the accompanying claims in such a manner that all the technical ideas included within the scope equivalent to the claims belong to the present disclosure.

What is claimed is:

1. A method for transmitting an uplink signal by a Narrow Band Internet of things (NB-IoT) user equipment (UE), the method comprising:
   receiving, from a base station, uplink resource allocation information for transmitting HARQ ACK/NACK for downlink data;
   configuring a time-axis wireless resource and a frequency-axis wireless resource of an uplink signal including the HARQ ACK/NACK, based on the uplink resource allocation information; and
   transmitting the uplink signal through the time-axis wireless resource and frequency-axis wireless resource,
   wherein the uplink resource allocation information includes subcarrier allocation information and sub-frame allocation information which are allocated for the transmission of the HARQ ACK/NACK for the downlink data;
   wherein the sub-frame allocation information includes sub-frame offset information for configuring the time-axis wireless resource of the uplink signal;
   wherein the sub-frame offset information includes a sub-frame offset value to be used to determine a location of an uplink sub-frame for the HARQ ACK/NACK by applying to the last sub-frame of repetitively receiving the downlink data, where the sub-frame offset value is differently allocated according to a subcarrier spacing of the NB-IoT UE,
   wherein the uplink resource allocation information is included in downlink control information which allocates the subcarrier allocation information and the sub-frame allocation information in pairs, and
   wherein the transmitting the uplink signal comprises transmitting the uplink signal including the HARQ ACK/NACK in uplink signal transmission subframe of the time-axis wireless resource which is determined as equation as follows, Uplink signal transmission sub-frame for HARQ ACK/NACK=last sub-frame $n$ for NPDSCH repetitive transmission+sub-frame allocation information $(K_n)$–A,  [Equation]

where the last sub-frame n for NPDSCH repetitive transmission is the last sub-frame of repetitively receiving the downlink data, the sub-frame allocation information $(K_n)$ is the sub-frame offset value, and the A is a predetermined natural number which is configured as 1.

2. The method of claim 1, wherein the downlink control information is received through the downlink control channel.

3. The method of claim 1, wherein the time-axis wireless resource of the uplink signal is configured by applying the sub-frame offset value to the last sub-frame of receiving the downlink data.

4. The method of claim 1, wherein the sub-frame offset value is allocated as 13 or 21.

5. A method for receiving an uplink signal by a base station, the method comprising:
   configuring uplink resource allocation information for receiving HARQ ACK/NACK for downlink data from a Narrow Band Internet of things (NB-IoT) user equipment (UE);

transmitting the uplink resource allocation information and the downlink data to the NB-IoT UE; and receiving an uplink signal including the HARQ ACK/NACK through a time-axis wireless resource and a frequency-axis wireless resource, which are configured based on the uplink resource allocation information, wherein the uplink resource allocation information includes subcarrier allocation information and sub-frame allocation information which are allocated for the transmission of the HARQ ACK/NACK for the downlink data;

wherein the sub-frame allocation information includes sub-frame offset information for configuring the time-axis wireless resource of the uplink signal;

wherein the sub-frame offset information includes a sub-frame offset value to be used to determine a location of an uplink sub-frame for the HARQ ACK/NACK by applying to the last sub-frame of repetitively receiving the downlink data, where the sub-frame offset value is differently allocated according to a subcarrier spacing of the NB-IoT UE, wherein the uplink resource allocation information is included in downlink control information which allocates the subcarrier allocation information and the sub-frame allocation information in pairs, and wherein the receiving the uplink signal comprises receiving the uplink signal including the HARQ ACK/NACK in uplink signal transmission subframe of the time-axis wireless resource which is determined as equation as follows, Uplink signal transmission sub-frame for HARQ ACK/NACK=last sub-frame $n$ for NPDSCH repetitive transmission+Sub-frame allocation information $(K_n)$–$A$, [Equation]

Where the last sub-frame n for NPDSCH repetitive transmission is the last sub-frame of repetitively receiving the downlink data, the Sub-frame allocation information $(K_n)$ is the sub-frame offset value, and the A is predetermined natural number which is configured as 1.

6. The method of claim 5, wherein the downlink control information is transmitted through the downlink control channel.

7. The method of claim 5, wherein the time-axis wireless resource of the uplink signal is configured by applying the sub-frame offset value to the last sub-frame of receiving the downlink data by the NB-IoT UE.

8. The method of claim 5, wherein the sub-frame offset value is allocated as 13 or 21.

9. A Narrow Band Internet of things (NB-IoT) user equipment (UE) for transmitting an uplink signal, the NB-IoT UE comprising:

a receiver configured to receive, from a base station, uplink resource allocation information for transmitting HARQ ACK/NACK for downlink data;

a controller configured to configure a time-axis wireless resource and a frequency-axis wireless resource of an uplink signal including the HARQ ACK/NACK, based on the uplink resource allocation information; and a transmitter configured to transmit the uplink signal through the time-axis wireless resource and frequency-axis wireless resource, wherein the uplink resource allocation information includes subcarrier allocation information and sub-frame allocation information which are allocated for the transmission of the HARQ ACK/NACK for the downlink data;

wherein the sub-frame allocation information includes sub-frame offset information for configuring the time-axis wireless resource of the uplink signal;

wherein the sub-frame offset information includes a sub-frame offset value to be used to determine a location of an uplink sub-frame for the HARQ ACK/NACK by applying to the last sub-frame of repetitively receiving the downlink data, where the sub-frame offset value is differently allocated according to a subcarrier spacing of the NB-IoT UE, wherein the uplink resource allocation information is included in downlink control information which allocates the subcarrier allocation information and the sub-frame allocation information in pairs, and wherein the transmitter transmits the uplink signal including the HARQ ACK/NACK in uplink signal transmission subframe of the time-axis wireless resource which is determined as equation as follows, Uplink signal transmission sub-frame for HARQ ACK/NACK=last sub-frame $n$ for NPDSCH repetitive transmission+Sub-frame allocation information $(K_n)$–$A$, [Equation]

Where the last sub-frame n for NPDSCH repetitive transmission is the last sub-frame of repetitively receiving the downlink data, the Sub-frame allocation information $(K_n)$ is the sub-frame offset value, and the A is a predetermined natural number which is configured as 1.

10. The NB-IoT UE of claim 9, wherein the downlink control information is received through the downlink control channel.

11. The NB-IoT UE of claim 9, wherein the time-axis wireless resource of the uplink signal is configured by applying the sub-frame offset value to the last sub-frame of receiving the downlink data.

12. The NB-IoT UE of claim 9, wherein the sub-frame offset value is allocated as 13 or 21.

* * * * *